United States Patent [19]
Stanley et al.

[11] 4,200,704
[45] Apr. 29, 1980

[54] CONTROLLED DEGRADATION OF POLY(ETHYLENE OXIDE)

[75] Inventors: Priscilla B. Stanley, Tarrytown; Donald F. Anderson, White Plains, both of N.Y.

[73] Assignee: Union Carbide Corporation, New York, N.Y.

[21] Appl. No.: 946,628

[22] Filed: Sep. 28, 1978

[51] Int. Cl.$^2$ ............................................. C08G 65/32
[52] U.S. Cl. ................................................. 525/409
[58] Field of Search .............................. 528/404, 421

[56] References Cited
U.S. PATENT DOCUMENTS

| T869,010 | 12/1969 | Willis | 260/2 |
|---|---|---|---|
| 2,982,742 | 5/1961 | Smith et al. | 260/2 |
| 3,337,487 | 8/1967 | Nandenberg | 260/79 |

Primary Examiner—Earl A. Nielsen
Attorney, Agent, or Firm—Franklyn Schoenberg

[57] ABSTRACT

Production of lower molecular weight poly(ethylene oxide) by controlled degradation of higher molecular weight poly(ethylene oxide) initiated by a free radical source in contact with oxygen.

4 Claims, No Drawings

CONTROLLED DEGRADATION OF POLY(ETHYLENE OXIDE)

BACKGROUND OF THE INVENTION

Poly(ethylene oxide) is presently commercially available in several grades, each grade having a specified molecular weight range. Of the several grades available, the most economical to produce is poly(ethylene oxide) having an average molecular weight of about 4,000,000 because this high molecular weight polymer is produced with the highest efficiency of ethylene oxide consumed based on catalyst. Mid-range grades of poly(ethylene oxide) are generally produced by partially poisoning the catalyst, for example, with acetonitrile, causing decreased efficiency of ethylene oxide on catalyst. Lower grades of poly(ethylene oxide) are generally produced by degradation of higher grades by irradiation with a cobalt-60 source. This process of producing mid-range and lower grades of poly(ethylene oxide) has disadvantages from both the cost and quality viewpoints. It requires the use of a lower efficiency production process than that which is used for producing the higher grades since the lower grades must be produced in a separate irradiation step with the poly(ethylene oxide) resin transported to the cobalt-60 source. Treating with cobalt-60 is hazardous and often each batch does not receive an exactly similar amount of radiation and as a consequence the end product suffers considerably from non-uniform molecular weight. Previous methods of degrading higher molecular weight poly(ethylene oxide) to lower molecular weight poly(ethylene oxide) using free radicals have been inefficient because the free radical sources used leave acid residues which must be removed to give stability to the poly(ethylene oxide), and because the high concentrations required create a need for several solvent washings to remove the free radical source from the poly(ethylene oxide) to prevent further degradation, and also because the high oxygen concentration required mandates the use of lower temperatures to reduce the explosion hazard thus increasing the time required for the degradation. A process which avoids the use of these less efficient methods of producing mid-range and lower molecular weight poly(ehtylene oxide) and leads to the more efficient production of more uniform molecular weight poly(ethylene oxide) would be highly desirable.

SUMMARY OF THE INVENTION

It has now been found that mid-range and low molecular weight poly(ethylene oxide) can be produced by the degradation of high molecular weight poly(ethylene oxide) initiated by a free radical source in contact with oxygen under conditions hereinafter defined. This novel process allows the more efficient production of mid-range and low molecular weight poly(ethylene oxide) having a more uniform molecular weight than was possible using the production processes heretorfore available.

DESCRIPTION OF THE INVENTION

In the process of this invention, lower molecular weight poly(ethylene oxide) is produced by the controlled degradation of higher molecular weight poly(ethylene oxide). The degradation is initiated by a free radical source in contact with oxygen.

The free radical initiator is a peroxide of the general formula:

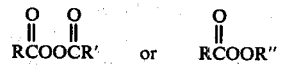

wherein R and R' can be:

(a) alkyl linear or branched, substituted or unsubstituted, having from one to forty carbon atoms, preferably from one to twenty carbon atoms, such as methyl, isopropyl, octyl, undecyl, eicosyl, tetracontyl and the like;

or (b) cycloalkyl, substituted or unsubstituted, having from four to eight ring carbon atoms such as cyclopentyl, 2-methylcyclohexyl, cyclooctyl and the like;

or (c) aryl, substituted or unsubstituted, such as tolyl, phenyl, xylyl, 2,4-dichlorophenyl, 4-chlorophenyl and the like;

or (d) aralkyl, substituted or unsubstituted having from seven to twenty carbon atoms such as benzyl, phenethyl, 4-methylbenzyl and the like; and where R" can be R, R' or hydrogen.

Illustrative of the free radical initiator suitable for use in this invention one can name, lauroyl peroxide, isononyl peroxide, decanoyl peroxide, acetyl peroxide, propionyl peroxide, isobutyryl peroxide, pelargonyl peroxide, benzoyl peroxide, 2-4,dichlorobenzoyl peroxide, 4-chlorobenzoyl peroxide, dibenzyl peroxydicarbonate, tertiary-butyl peroxyisobutyrate, tertiary-butyl peroxypivalate, tertiary-butyl peroxy(2-ethylhexoanoate), hydroxy heptyl peroxide, tertiary-butyl peroxy(2-phenylacetate), acetyl benzoyl peroxide, succinic acid peroxide and the like. The preferred initiator is lauroyl peroxide.

The R, R' and R" groups can be unsubstituted or substituted with any substituent group which will not unduly interfere with the generation of free radicals or the reaction. Thus, there can be present as substituent groups chloro, methoxy methyl or other groups known to be non-interfering.

The initiator is present at a concentration of from about 0.01 weight percent to about 5 weight percent, preferably from about 0.1 weight percent to about 2 weight percent based on the weight of poly(ehtylene oxide) present. The concentration of the initiator will depend on the particular initiator selected, the molecular weight of the starting poly(ethylene oxide), the temperature at which the reaction is run and the amount of degradation that is desired.

The initiator is introduced to the reaction mixture dissolved in a hydrocarbon solvent, such as toluene, in the ratio of from 0.005 to 0.5 gram per ml of solvent, preferably from 0.01 to 0.1 gram per ml of solvent. The particular solvent used is not critical since it is used as a carrier only.

In carrying out the process, the poly(ethylene oxide) is present at a concentration of from about 5 weight percent to about 40 weight percent, preferably from about 5 weight percent to about 20 weight percent based on the total weight of the reaction mixture.

The reaction is generally carried out in a solvent which suspends the poly(ethylene oxide). The solvent can swell the poly(ethylene oxide) but need not dissolve it. In practice the solvent used will usually be the hydrocarbon system in which the poly(ethylene oxide) is prepared. Illustrative of suitable solvents one can name iso-octane, pentane, hexane, etylene glycol and 1,3- butanediol. The solvent is present at a concentration of from about 2 ml to about 20 ml per gram of poly(ethylene oxide), preferably from about 5 ml to about 15 ml per gram of poly(ethylene oxide).

One can also have present in the reaction mixture fumed silica, if desired. The fumed silica is added to counter the tendency of the softened resin particles to agglomerate. It is present at a concentration of from about 0.1 weight percent to about 10 weight percent, preferably from about 0.5 weight percent to about 5 weight percent based on the weight of poly(ethylene oxide) present.

The reaction can be carried out at atmospheric, subatmospheric or superatmospheric pressure in an atmospheric which contains a partial oxygen pressure. Although the reaction can be run in air containing twenty percent oxygen or in atmospheres which contain even higher amounts of oxygen, in practice such a large concentration of oxygen is not desirable due to the sometimes flammable, explosive nature of the reaction mixture vapor-phase. Preferably the reaction is carried out in an inert atmosphere such as nitrogen or argon in which oxygen is present at a concentration of from greater than 0 ppm to about 500 ppm, most preferably from about 25 ppm to about 250 ppm, based on the amount of solvent present.

The reaction can be carried out at a temperature of from about 60° C. to 80° C. preferably from 65° C. to 75° C. It is preferred not to carry out the reaction at temperatures significantly above the softening point of poly(ethylene oxide), which is at about 65° C. At temperatures below about 50° C. the reaction proceeds very slowly, if at all, depending upon the particular peroxide compound used. As previously indicated, fumed silica can be added to prevent agglomeration of the softened resin particles.

The time required for the reaction will vary and is dependent upon the specific reactants and their concentrations, the reaction temperature, the size of the batch as well as the desired molecular weight of the product to be attained.

In a typical embodiment 1.5 grams of fumed silica and 750ml of iso-octane were charged to a 2-liter 4-neck round bottom flask, equipped with a mechanical stirrer, reflux condenser, thermometer and nitrogen purge and the reactor was purged with nitrogen for one hour at 70° C. To this was added 100 grams of granular poly(ethylene oxide) having an average molecular weight of about 4,000,000. The mixture was allowed to equilibrate for one hour and then a solution of 0.64 gram of lauroyl peroxide in 10.7 ml of toluene was added. The free oxygen concentration in the reactor was from 75 ppm to 150 ppm based on the amount of iso-octane present. The reaction proceeded for 45 minutes after which the average molecular weight of the poly(ethylene oxide) had been reduced to from 900,000 to 1,500,000.

The molecular weight of the product poly(ethylene oxide) can be predetermined and can be obtained by varying in any particular reaction the initiator and initiator concentration, the amount of oxygen available, the reaction temperature and the reaction time.

The product of the process of this invention is poly(ethylene oxide) having an average molecular weight lower than that of the starting material and is generally from 100,000 to 3,500,000. Such low to moderate molecular weight poly(ethylene oxides) have many uses among which one can mention their use as thickeners and stabilizers for deicing fluids, as softeners and thickeners in cosmetic creams, lotions and shampoos, as water-based lubricants in metal-working, drawing, and tire-mounting fluids, as binders in nonwoven fabrics, pharmaceutical tablets and cigarette filters, and as plasticizers for poly(vinyl acetate) resins.

This invention is of great advantage in the production of low and mid-range grades of poly(ethylene oxide). Less efficient methods of production which require the poisoning of a catalyst or the transport of high molecular weight poly(ethylene oxide) to a cobalt-60 source can be eliminated. The process of this invention also produces low molecular weight poly(ethylene oxide) at a more uniform molecular weight than was heretofore possible.

It was completely unexpected and unobvious to find that high molecular weight poly(ethylene oxide) in contact with oxygen and a free radical source would degrade to mid-range and low molecular weight poly(ethylene oxide) and that this degradation could be controlled to give a poly(ethylene oxide) resin of a predetermined average molecular weight.

The following examples serve to further illustrate the invention.

EXAMPLE 1

A 2-liter 4-neck round bottom flask equipped with a mechanical stirrer, reflux condenser, thermometer and nitrogen purge was charged with 1.5 grams of fumed silica, 750 ml of iso-octane and 100 grams of poly(ethylene oxide) having an average molecular weight of about 4,000,000 and a 2 percent aqueous solution viscosity of 30,000 cps. The reactor was cooled to −70° C. in a Dry Ice bath and purged with argon for three hours while being vigorously stirred. The flask was then heated to 70° C. with a nitrogen purge and allowed to equilibrate. The free oxygen content of the reactor was less than 10 ppm based on the amount of solvent present. A solution of 0.64 gram lauroyl peroxide in 10.7 ml of toluene was degassed by passing a stream of nitrogen through it and then it was added to the reactor. The reaction mixture was stirred at atmospheric pressure and samples were taken at the start and after 30 and 60 minutes. The samples were cooled, filtered, dried overnight in darkness under vacuum and then ground to 20 mesh. The viscosities of the samples were measured on a viscometer and the results are shown in Table I. The decrease in viscosity is proportional to the decrease in molecular weight. After 60 minutes of reaction the molecular weight of the poly(ethylene oxide) was estimated to be from 3,100,000 to 3,500,000.

TABLE I

| Time (min.) | Viscosity of 2% Aqueous Solution (cps) at 23° C. |
| --- | --- |
| 0 | 30,000 |
| 30 | 15,920 |
| 60 | 11,980 |

EXAMPLE 2

Following the procedure described in Example 1, 100 grams of the same poly(ethylene oxide) was purged with nitrogen for 4 hours at 70° C. to an oxygen content of from 25 to 75 ppm. This was then reacted at 70° C. with 0.64 gram of lauroyl peroxide in 10.7 ml of toluene, as described in Example 1. Samples were taken for analysis at the start and after 20 and 45 minutes. The results are shown in Table II. After 45 minutes of reaction the molecular weight of the poly(ethylene oxide) was estimated to be from 1,700,000 to 2,500,000.

TABLE II

| Time (min.) | Viscosity of 2% Aqueous Solution (cps) at 23° C. |
|---|---|
| 0 | 30,000 |
| 20 | 11,050 |
| 45 | 3,360 |

EXAMPLE 3

Following the procedure described in Example 2, 100 grams of the same poly(ethylene oxide) was purged for one hour to an oxygen content of from 75 to 150 ppm. The results are shown in Table III. After 45 minutes of reaction the molecular weight of the poly(ethylene oxide) was estimated to be from 900,000 to 1,500,000.

TABLE III

| Time (min.) | Viscosity of 2% Aqueous Solution (cps) at 23° C. |
|---|---|
| 0 | 30,000 |
| 20 | 5,850 |
| 45 | 815 |

EXAMPLE 4

The procedure described in Example 3 was repeated twice and the results are shown in Table IV.

TABLE IV

| Time (min.) | Viscosity of 2% Aqueous Solution (cps) at 23 C. | |
|---|---|---|
| | Run A | Run B |
| 0 | 30,000 | 30,000 |
| 20 | 2,055 | 3,090 |
| 45 | 735 | 1,600 |

After 45 minutes of reaction, the molecular weight of the poly(ethylene oxide) in Run A was estimated to be from 800,000 to 1,300,000 and in Run B to be from 1,500,000 to 2,000,000.

EXAMPLE 5

Following the procedure described in Example 2, a mixture containing 100 grams of the same poly(ethylene oxide) was charged to the apparatus and allowed to equilibrate for one hour before the lauroyl peroxide solution was added. The reaction was run with an air atmosphere using conditions similar to those described in Example 2. Samples were taken at the start and after 10, 20, 30, and 45 minutes. The entire procedure was then repeated. The samples from the two runs were treated and analyzed using procedures similar to those described in Example 1. The results are shown in Table V. The estimated molecular weight of the poly(ethylene oxide) in both runs A and B was from 800,000 to 950,000 after 45 minutes reaction time.

TABLE V

| Time (min.) | Viscosity of 2% Aqueous Solution (cps) at 23° C. | |
|---|---|---|
| | Run A | Run B |
| 0 | 30,000 | 30,000 |
| 10 | 1,785 | 1,915 |
| 20 | 1,195 | 900 |
| 30 | 642 | 541 |
| 45 | 338 | 280 |

To illustrate the effect of temperature, the above described procedures were repeated except that the reaction was run at 60° C. Samples were taken at the start and after 35, 65 and 95 minutes and treated and analyzed by procedures similar to those described in Example 1. The results are shown in Table VI. After 95 minutes the viscosity indicated that the molecular weight of the poly(ethylene oxide) was still from 3,700,000 to 4,000,000. The data shows that the degradation is not as effective with lauroyl peroxide when run at 60° C.

TABLE VI

| Time (min.) | Viscosity of 1% Aqueous Solution (cps) at 23° C. |
|---|---|
| 0 | 2,485 |
| 35 | 2,390 |
| 65 | 2,225 |
| 95 | 1,870 |

EXAMPLE 6

Poly(ethylene oxide) resin was synthesized by suspension polymerization of ethylene oxide in 2 liters of iso-octane using a calcium amide catalyst, in the apparatus described in Example 1. The resin produced amounted to 205 grams and had an average molecular weight of 4,000,000 and a 1 percent aqueous solution viscosity of 2,500 cps. The unreacted ethylene oxide was vented and the reaction mixture was heated to about 70° C. under a nitrogen purge. The free oxygen content of the reactor was from 50 to 150 ppm based on the amount of solvent present. A solution of 1.8 grams of lauroyl peroxide in 30.6 ml of toluene was added and the reaction carried out under conditions similar to those described in Example 2. Samples were taken at the start and after 30 minutes and they were processed and analyzed using procedures similar to those described in Example 1. After 30 minutes the 1 percent aqueous solution viscosity was 15 cps and the molecular weight of the poly(ethylene oxide) was estimated to be about 400,000. This example shows that lower molecular weight poly(ethylene oxide) can be produced from high molecular weight poly(ethylene oxide) by the process of this invention in a continuous manner without the need to separate the high molecular weight poly(ethylene oxide) from the reaction mixture in which it is synthesized.

What is claimed is:

1. A process for reducing the molecular weight of poly(ethylene oxide) which comprises heating a mixture of a higher molecular weight poly(ethylene oxide); from 0.1 weight percent to 5 weight percent based on the amount of said poly(ethylene oxide) of a non acid peroxide of the general formula:

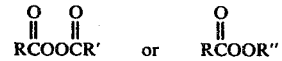

wherein R and R' can be:
(a) alkyl, linear or branched, substituted or unsubstituted, having from one to forty carbon atoms; or
(b) cycloalkyl, substituted or unsubstituted, having from four to eight ring carbon atoms; or
(c) aryl, substituted or unsubstituted; or
(d) aralkyl, substituted or unsubstituted, having from seven to twenty carbon atoms;

and wherein R″ can be R or R′; a diluent which suspends the poly(ethylene oxide); and from 10 to 500 ppm based on the amount of diluent present of oxygen, at from 60° to 80° C.

2. A process as claimed in claim 1 wherein said peroxide is lauroyl peroxide.

3. A process as claimed in claim 1 wherein said poly(ethylene oxide) is present at a concentration of from about 5 weight percent to about 40 weight percent based on the total weight of said mixture.

4. A process as claimed in claim 1 wherein said mixture is heated until poly(ethylene oxide) of a desired molecular weight is attained.

* * * * *